INVENTOR.
BY Georg Ornstein
Fredrich E. Haun
ATTY.

May 15, 1945.   G. ORNSTEIN   2,376,178
APPARATUS FOR SUPPLYING A TREATING MEDIUM
Filed Jan. 9, 1942   2 Sheets-Sheet 2
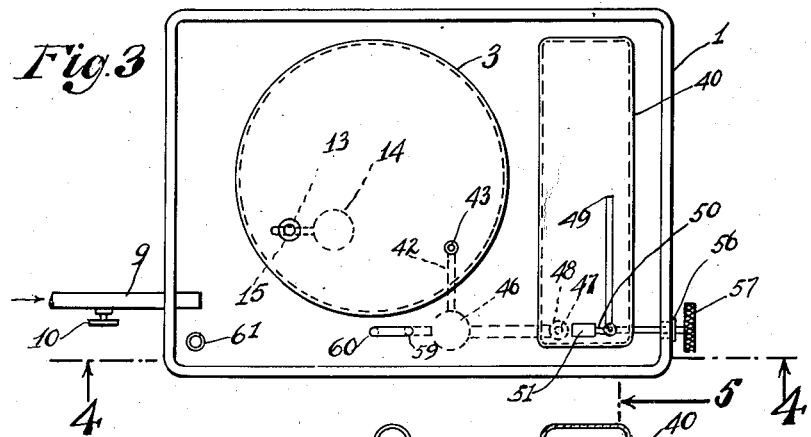
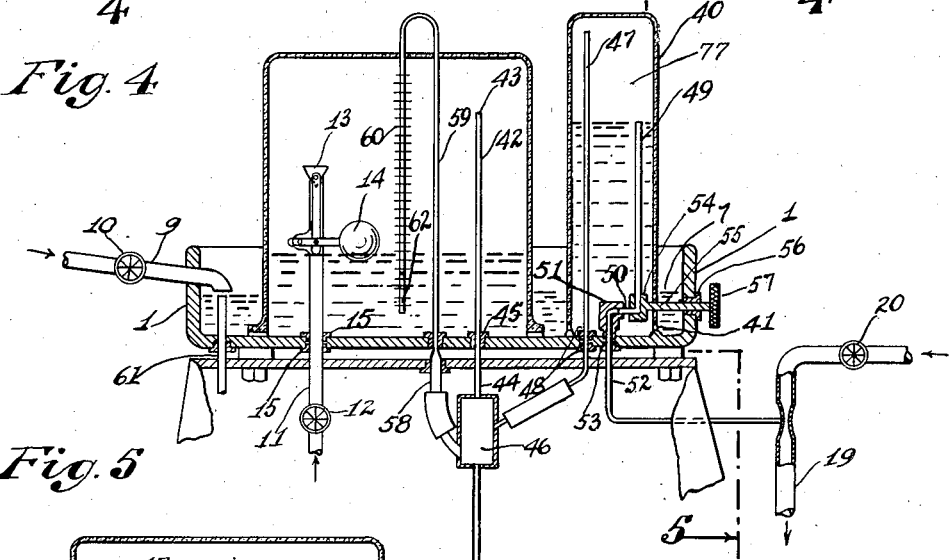
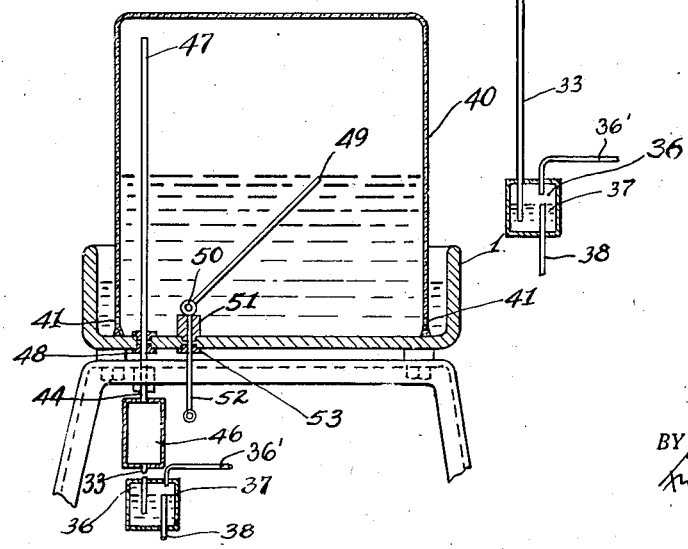
INVENTOR.
Georg Ornstein
BY
Frederick E. Hahn
ATTY Patented May 15, 1945

2,376,178

UNITED STATES PATENT OFFICE 2,376,178

APPARATUS FOR SUPPLYING A TREATING MEDIUM

Georg Ornstein, New York, N. Y.

Application January 9, 1942, Serial No. 426,165

11 Claims. (Cl. 210—28)

My invention relates to apparatus for supplying a treating medium preferably treating gas at a controlled rate and more especially to an apparatus for supplying chlorine gas at a controlled and measured rate to a flowing medium, such as water, for instance water of cities or sewage or to other liquids.

In the treating of water with chlorine or any other suitable treating gas the chlorine is fed into the stream of water to be treated. In order to know the amount of chlorine being supplied, the rate of supply of chlorine must be accurately controlled and measured. Various methods of control are known. One which is widely known and has been preferably used in chlorine controlled apparatus is to cause the gas to pass through a flow controlling orifice and to determine the rate of flow of the gas by measuring the drop of pressure across the orifice by maintaining a constant pressure on the upstream side of the orifice and measuring the pressure difference by means of a manometer. One type of apparatus based on this method of control is equipped with a tray in which is maintained a body of water at constant level, with a bell jar placed in the tray and its interior communicating with the water in the tray, with a pipe for admitting chlorine into the bell jar, with a suction pipe for withdrawing the gas from the bell jar and with means for controlling the supply of chlorine. Since the flow of gas through the orifice varies as the square root of the pressure drop across the orifice, adjustment of the flow rate at the low rates of feed which cause a very small pressure drop across the orifice is difficult, because of the relatively small change in negative head required to produce a relatively great change in the flow rate.

The main object of my invention is to improve the accuracy of indication of the gas flow rate in gas supply apparatus conventionally called "chlorinators" in which the flow rate depends on the drop in pressure across a flow controlling orifice and is indicated by such drop in pressure.

Another object of my invention is the design of a chlorinator being very simple in construction, efficient in operation and reliable under all ordinary conditions of use. A chlorinator according to my invention consists of comparatively few elements which are of sturdy and simple design. Only very few stuffing boxes and movable parts are required which can be easily made and kept tight. This is of particular importance in view of the dangerous nature of chlorine and its highly corrosive properties.

Another object of my invention is to provide means for preventing any flow of liquid in which treating gas is or may be dissolved from the bell jar or a similar container into the open tray.

Another object of my invention is to provide means which permit an accurate and simple reading of the pressure on a scale which may be calibrated to read in lbs. of chlorine per a suitable time unit.

Other and further objects of my invention will be hereinafter set forth and the novel features thereof defined by the appended claims.

In the accompanying drawings several embodiments of my invention are shown.

Fig. 3 is a plan view of a third embodiment of a chlorinator according to my invention.

Fig. 4 is a sectional view along line 4—4 of Fig. 3, and

Fig. 5 is a sectional view along line 5—5 of Fig. 4.

Figure 1:
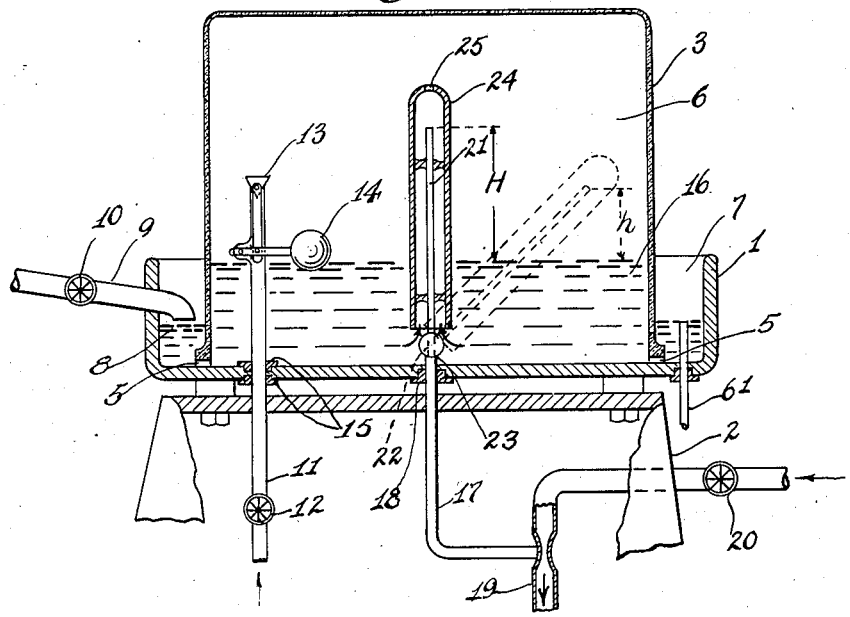
Fig. 1 is a sectional view of a chlorinator according to my invention.

The chlorinator shown in Fig. 1 comprises a tray or open receptacle 1 which may be made of any suitable material for instance hard rubber and which is supported by a standard 2 of conventional design. In the tray a container such as bell jar 3 preferably of transparent material, for instance glass, is placed. At the lower edge of bell jar 3 channels or vents 5 are provided to permit a flow of liquid such as water between the inside 6 of bell jar 3 and the outside 7. In tray 1, a body of water 8 is maintained at a predetermined level preferably by an overflow tube 6'. The water may be admitted through a spigot 9. The intake of water can be controlled by a valve 10 or a float valve of conventional design. Chlorine is admitted into bell jar 3 through pipe 11 which is controlled by a conventional valve 12. Pipe or tube 11 is provided at its top with a float valve 13 having a swimmer or float 14. The passage of tube 11 through tray 1 is kept tight by stuffing boxes 15. Float valve 13 will open and admit fresh chlorine gas as soon as the water 16 within the bell jar rises to reach a certain level. If the water drops below this level the float valve 13 will close again. By this means a constant water level may be maintained inside the jar irrespective of the level of water in the tray outside the same and a constant flow of chlorine gas is assured.

Passing up through the bottom of tray 1 and tightened by means of stuffing box 18 is a pipe 17 which communicates with an aspirator 19, for instance a Venturi tube. This tube may be controlled by a valve 20 in any conventional manner. With the upper end of tube 17 an inner tube 21 is pivotably connected. The pivotable connection can be made by any suitable means for instance by a joint 22, which is provided with a passage connecting tubes 17 and 21. Inner tube 21 is surmounted by a meter tube 24 containing a small orifice 25 in its otherwise closed top. The lower end of tube 24 is open and below the level of the water in bell jar 3.

The suction produced by aspirator 19 draws the gas through orifice 25 from the upper part of the bell jar through the upper part of tube 24, tube 21, tube 17 into the aspirator 19 where it is dissolved in a stream of liquid, for instance water flowing through the aspirator. The suction produces a partial vacuum in the bell jar and raises the level of the water therein above that in tray 1 as indicated in Fig. 1. The rate of flow of chlorine is determined by the difference in pressure in the bell jar and within tube 24. Since the capacity of the aspirator is greater than the amount of gas admitted through orifice 25 in the top of tube 24 and since the lower end of tube 24 is open and below the level of the water in the jar, the suction of the aspirator will raise the level of the water in tube 24 up to the level of the top of tube 21. The raised water will flow off through tube 21 in which it is mixed with the aspirated chlorine. The solution will be discharged into aspirator 19. The pressure acting to draw off the gas will be indicated by the difference of the level of water in tube 24 and the water level in the bell jar. Consequently, the pressure acting to draw off gas can be adjusted and regulated by tilting tubes 21 and 24 around joint 22. If for instance the two tubes are brought into the position indicated by a dotted line, the vertical distance between the water level and the top of tube 21 is reduced from H to h. Therefore, the pressure acting to draw off the gas is correspondingly reduced. Hence the various angular positions of the tubes indicate the rate at which gas is drawn from the bell jar and fed into stream of water. A calibration to indicate the rate at which gas is withdrawn can be provided if so desired.

The tilting of the tubes around their pivot can be made by any suitable means for instance by a hand knob.

It is apparent from Fig. 1 and its description that tubes 24 and 21 do not change their relative position to each other when tilted. Consequently, there is no difficulty to secure the tubes in a proper position to each other. They may be further secured by little plugs or crossbars shown in the drawings. Furthermore, the only movable part of the apparatus are the two tubes which pivot around a common joint 22. This is a very simple movement which can be easily controlled. The design of the joint may be made in any conventional manner.

Figure 2:
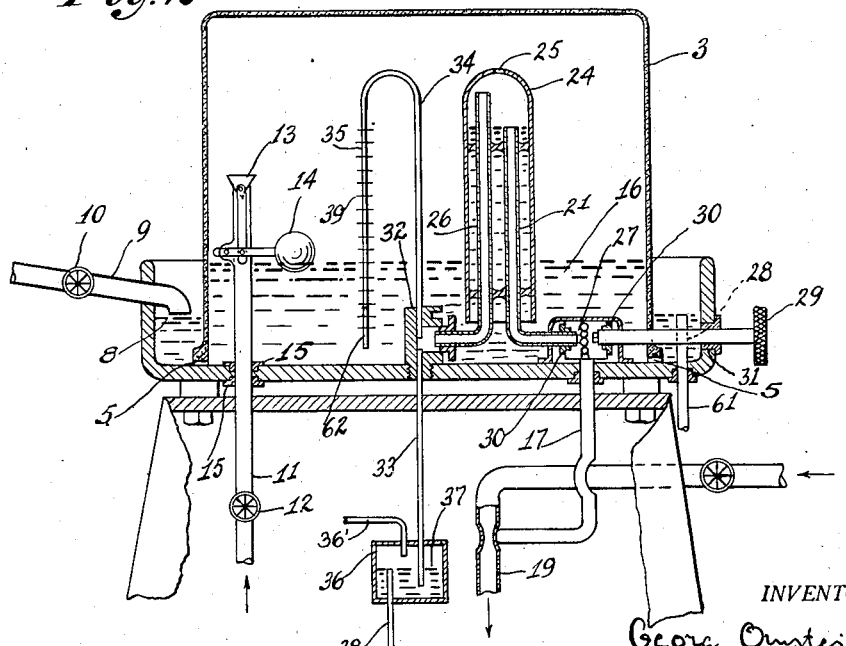
Fig. 2 is a sectional view of a second embodiment of a chlorinator according to my invention.

The embodiment of my invention shown in Fig. 2 is based on the same principles as the apparatus shown in Fig. 1. The same numerals designate the same elements, therefore, these elements are not described in connection with Fig. 2.

The apparatus shown in Fig. 2 permits a very high degree of accuracy of adjustment and indication of the gas flow rate. I accomplish this by providing a separate manometer, which is stationary and independent of the tilting of the orifice tube 24 and of the second tube 21 controlling the pressure drop. I have found that the liquid within the orifice tube has a certain tendency to jump or jerk whereby the reading accuracy of the gas flow rate is affected.

In addition to the orifice tube 24 and tube 21 controlling the gas pressure drop, I provide a third tube 26 communicating with a manometer hereinafter described. Tubes 21 and 26 are L-shaped. The lower end of tube 21 ends within a junction element 27 that connects tube 21 with tube 17 which communicates with aspirator 19. Junction element 27 can be turned by means of an axle 28 and a milled knob 29. In order to prevent any leakage of liquid 16 or chlorine gas, stuffing boxes 30 and 31 may be provided. The upper end of tube 26 is always above the level of the aspirated water within orifice tube 24, this level being determined by the top of tube 21. The lower end of tube 26 ends within a second junction element 32. This junction element connects tube 26 with a tube 33 and manometer 34. Manometer 34 may be of any suitable type. I prefer the use of a U-type manometer. The downwardly directed arm 35 of this manometer extends into the body of water 16 within the bell jar. Tube 33 is connected with a liquid trap comprising a closed container 36 provided with a blow-off pipe 36' and filled with a suitable liquid 37, for instance water and an overflow tube 38. The liquid trap serves to discharge any water accidentally entering tube 26 or 34, in order to prevent such liquid from influencing the indications of the manometer.

As apparent from the drawings and the specification tubes 24, 21 and 26 can be tilted by turning milled knob 29, while the U-type manometer 34 will remain stationary in its vertical position. As described in connection with Fig. 1, the angular position of tube 21 will determine the pressure drop across orifice 25 and hence the flow rate of the gas. The pressure, usually negative, in the space behind orifice 25 and above the liquid level within tube 24, to wit the pressure on the downstream side of the orifice will be transmitted to manometer 34 through tube 26 and junction element 32. As long as there is no drop in pressure across the orifice 25 the liquid level in the downward arm 35 of manometer 34 will correspond to the level of liquid 16 inside of the bell jar. When aspirator 19 is working and aspirates a solution of gas and water through tube 21, the drop of pressure then created behind orifice 25 will cause to rise the liquid within arm 35. The level to which the liquid is raised will indicate the negative pressure on the downstream side of orifice 25. A scale 39 can be marked or associated with meter arm 35. This scale can be calibrated for instance to read in lbs. of chlorine per a time unit.

Manometer 34 will give an accurate indication, since it is largely independent of any jumping or jerking of the liquid within orifice tube 24. At the lower end of the meter arm of the manometer I may provide a capillary tube 62 which smoothes the movements of water within the meter tube thus improving the reading accuracy of the manometer. By varying the angular position of orifice tube 24 and the tubes which are surmounted by this tube any desired pressure drop on the downstream side of the orifice can be obtained.

In the apparatus shown in Figs. 3, 4 and 5 the same numerals designate similar elements. Therefore, a description of these elements is not repeated.

The apparatus according to Figs. 3, 4 and 5 is based on the same principles as the apparatus shown in Figs. 1 and 2. However, the tube for controlling the pressure drop over the orifice is not surmounted by an orifice tube but provided in a separate receptacle or bell jar 40. This bell jar is placed on tray 1 and provided with passages or vents 41. The orifice tube 42 with its flow controlling orifice 43 is stationarily arranged within bell jar 3. Tube 42 is connected with a tube 44 which is passed through the bottom of tray 1 by means of a stuffing box 45. Tube 44 ends within a closed container 46 which in turn communicates with a tube 47. This tube is stationarily arranged within jar 40 and passed through the bottom of tray 1 by means of a stuffing box 48. Tube 49 for controlling the drop in pressure across orifice 43 by a negative hydraulic head and for discharging a solution of chlorine and water into the stream of water flowing through aspirator 19 is pivotably disposed in jar 40. Tube 49 ends in an L-section 50 which extends into a junction or connection element 51. This element 51 is secured by threads or any other suitable means to the bottom of tray 1 and serves as a communication between tube 49 and a tube 52 which in turn discharges into aspirator 19. Tube 52 extends into element 51 and is passed through the bottom of tray 1 by means of a stuffing box 53. The knee of tube 49 is engaged by a sleeve or jacket 54 to which is secured an axle or rod 55 which is passed through the walls of jar 40 and tray 1 by means of a stuffing box 56 and can be turned by a milled knob 57 or any other suitable means.

Chamber 46 is connected through an intermediate tube 58 with one arm 59 of a U-type manometer. The other arm 60 of this manometer on which a meterscale may be marked is open at the bottom and extends below the level of the liquid in tray 1. A capillary tube 62 may be provided at the end of meter arm 60. Chamber 46 further communicates with the liquid trap 33, 36, 37 and 38 as described in connection with Fig. 2. This liquid trap serves to discharge any liquid reaching chamber 46 through tube 47 or 59 in order to prevent manometer 60 from becoming liquid bound. As soon as a stream of liquid such as water begins to flow through aspirator 19, the aspirator begins to draw chlorine gas conveyed into bell jar 3 through orifice 43, tube 42, tube 44, chamber 46, tube 47, tube 49 and tube 52. As a result a partial vacuum is created which will cause to rise the liquid level in bell jars 3 and 40. The liquid level in jar 3 will be controlled by float valve 13. The liquid in jar 40 will rise to the top of tube 49 and chlorine gas conveyed into the space 77 above the liquid level in jar 40 and liquid from this jar will be drawn into tube 49 and fed into the liquid flowing through aspirator 19. As previously described the angular position of tube 49 will control the pressure drop across the orifice and hence the flow of gas through orifice 43. Consequently, by turning knob 57 the flow of gas can be easily adjusted.

Fig. 5 shows tube 49 in an intermediate position.

The flow of gas will be measured by the manometer and indicated by its arm 60 with which a scale may be associated. This scale may be calibrated in any suitable manner for instance in lbs. of chlorine per a time unit. Since arm 59 of this manometer communicates with space 77, the difference between the negative pressures within bell jars 3 and 40 respectively will control the indication of the manometer. As long as there is no pressure difference influencing the manometer, the liquid level in arm 60 will correspond to the liquid level inside of the bell jar 3 which indicates that there is no flow of gas through orifice 43.

The manometer may be provided at any suitable place inside or outside of bell jar 3. It will also be possible to use tube 33 as a manometer and to associate the scale with this tube. The liquid level in this tube will rise in accordance with the difference between the negative pressure produced by aspirator 19 and the atmospheric pressure exerted on liquid 37 in container 36. The zero point of the scale will be determined by the liquid level in jar 3. It is also possible to use bell jar 40 as a manometer. The pressure will be indicated by the difference of the liquid levels within bell jars 3 and 40 respectively. A reading scale can be associated with bell jar 40.

Instead of using a simple aperture as orifice it will also be possible to use a capillary tube as orifice for controlling the pressure drop. The use of a capillary tube has the advantage, that flow of gas through the orifice does no longer vary as the square root of the pressure drop across the orifice but approaches a linear ratio. This will result in a wider spacing of the reading marks in the lower readings within the range of the apparatus.

The embodiments of my invention shown in Figs. 1-5 provide vents or passages between the bell jar and the tray permitting a flow of liquid from the tray into the bell jar and vice-versa. When liquid flows from a bell jar back into the tray, minute quantities of chlorine dissolved in the liquid within the bell jar will escape from the bell jar. Such minute quantities of chlorine are not dangerous but produce an unpleasant odor.

I do not wish my invention to be limited to the embodiments shown in and described herein, as various changes may be made without departing from the scope of my invention.

Having thus described my invention what I claim as new and desire to secure by Letters Patent is:

1. In an apparatus for supplying a sterilizing gas to a liquid to be sterilized, in combination a tray in which is maintained a body of liquid, means for supplying said liquid to said tray, a closed container placed in said tray, said container having an opening for the passage of liquid between said tray and said container, means for admitting said gas into said container and means for withdrawing said gas from said container and liquid from said tray and for feeding them into said liquid to be sterilized, said latter means comprising a member providing a flow controlling orifice having an upstream and a downstream side, a suction device for drawing gas through said flow controlling orifice thus causing a pressure drop across said orifice and for aspirating said liquid, a common member located at the downstream side of the orifice for controlling the drop in pressure across the orifice and for feeding said gas drawn through said orifice and said liquid aspirated by said suction device into said liquid to be sterilized and pivot means for a pivotal arrangement of said member for adjusting the drop in pressure across said orifice.

2. In an apparatus for supplying a sterilizing gas to a liquid to be sterilized, in combination a tray in which is maintained a body of liquid, means for supplying said liquid to said tray, a closed container placed in said tray, said container having an opening for the passage of liquid between said tray and said container, means for admitting said gas into said container and means for withdrawing said gas from said container and liquid from said tray and for feeding them into said liquid to be sterilized, said latter means comprising a member providing a flow controlling orifice having an upstream side and a downstream side, a suction device for drawing gas through said flow controlling orifice thus causing a pressure drop across said orifice and for aspirating said liquid, a common member located at the downstream side of the orifice for controlling the drop in pressure across the orifice and for feeding said gas drawn through said orifice and said liquid aspirated by said suction device into said liquid to be sterilized and pivot means for a pivotal arrangement of said member having said flow controlling orifice and said member for controlling the pressure drop and for feeding said aspirated gas and liquid into said liquid to be sterilized for adjusting the drop in pressure across said orifice.

3. In an apparatus for supplying a sterilizing gas to a liquid to be sterilized, in combination a tray in which is maintained a body of liquid, means for supplying said liquid to said tray, a closed container placed in said tray, said container having an opening for the passage of liquid between said tray and said container, means for admitting said gas into said container and means for withdrawing said gas from said container and liquid from said tray and for feeding them into said liquid to be sterilized, said latter means comprising a tube open at the bottom extending below the level of said liquid in said container and providing a flow controlling orifice having an upstream side and a downstream side, a suction device for drawing gas through said flow controlling orifice thus causing a pressure drop across said orifice and for aspirating said liquid, a common member located at the downstream side of the orifice for controlling the drop in pressure across the orifice and for feeding said gas drawn through said orifice and said liquid aspirated by said suction device into said liquid to be sterilized and pivot means for a pivotal arrangement of said member for adjusting the drop in pressure across said orifice.

4. In an apparatus as described in claim 3, said common member comprising a second tube for controlling the drop in pressure across the orifice and for feeding said gas drawn through said orifice and said liquid aspirated by said suction device into said liquid to be sterilized, said second tube being surmounted by said first tube having the orifice and communicating with said suction device and pivot means for tilting said tubes about a pivot for adjusting the drop in pressure across said orifice.

5. In an apparatus for supplying a sterilizing gas, in combination a tray in which is maintained a body of liquid at a constant level, means for supplying said liquid to said tray, an inverted bell jar placed in said tray, said bell-jar having an opening for the passage of liquid between said tray and said bell jar, means for conveying said gas into said bell-jar, means for controlling the conveyance of gas into said bell jar, a tube open at the bottom extending below the level of liquid in the bell-jar and having a flow controlling orifice at the top provided within said bell-jar, an aspirator for drawing gas through said orifice thus causing a pressure drop across said orifice and for aspirating liquid and feeding them into a stream of liquid, a second tube for controlling the drop in pressure across the orifice and for feeding gas drawn through said orifice and liquid aspirated by said aspirator into said stream of liquid, said second tube being provided within said first tube and communicating with said aspirator and pivot means for tilting said two tubes about a common pivot for adjusting the drop in pressure across said orifice.

6. In an apparatus for supplying a sterilizing gas, comprising a tray in which a body of liquid is maintained, means for supplying said liquid to said tray, a closed container placed in said tray, said container having an opening for the passage of liquid between said tray and said container, means for conveying gas into said container, a suction device for withdrawing gas and liquid and for feeding them into a stream of liquid, a tube open at the bottom extending below the level of said liquid in the container and providing an orifice having an upstream side and a downstream side for controlling the flow of gas withdrawn by said suction device said suction device causing a pressure drop across said orifice, a second tube for controlling the drop in pressure across the flow controlling orifice and for feeding said gas and said liquid withdrawn by said suction device into said stream of liquid, pivot means for a pivotal arrangement of said second tube for adjusting the drop in pressure across said orifice by changing the position of said second tube relative to the level of the liquid in the container, a U-type manometer for measuring and indicating the pressure and drop across said orifice, one arm of said manometer extending into the body of liquid maintained in said tray and the other arm communicating with said orifice tube on the downstream side of said orifice.

7. In an apparatus according to claim 6, a capillary tube at the end of the arm of said manometer extending into the body of the liquid maintained in said tray.

8. In an apparatus as described in claim 6, a third tube for connecting one arm of said manometer with said orifice tube on the downstream side of said orifice.

9. In an apparatus as described in claim 6, a trap communicating with one arm of the manometer and the orifice tube on the downstream side of the orifice for removing any liquid discharged into said third tube before such liquid reaches said manometer.

10. In an apparatus for supplying a sterilizing gas, comprising a tray in which a body of liquid is maintained, means for supplying said liquid to said tray, a closed container placed in said tray, said container having an opening for the passage of liquid between said tray and said container, means for conveying said gas into said container, a suction device for withdrawing gas and liquid and for feeding them into a stream of liquid to be sterilized, a tube having an orifice for controlling the flow of gas withdrawn by said suction device, said suction device causing a pressure drop across said orifice, a second closed container placed in said tray, said second container providing a passage between said tray and said second container for said liquid, a second tube connecting said orifice tube with said second container, a third tube located in said second container for controlling the drop in pressure across the flow controlling orifice and feeding gas and liquid withdrawn by said suction device into said stream of liquid provided within said second container and pivotal means for a pivotal arrangement of said third tube for adjusting the drop in pressure across said orifice.

11. In an apparatus for supplying sterilizing gas, comprising a tray in which a body of liquid is maintained, means for supplying said liquid to said tray, an inverted bell jar placed in said tray, said bell jar having an opening for the passage of liquid between said tray and said bell jar, means for conveying said gas into said bell jar, means for controlling the conveyance of gas into said bell jar, a tube open at the bottom extending below the level of liquid in said bell jar and having a flow controlling orifice at the top provided within said bell jar, an aspirator for drawing gas through said orifice thus causing a pressure drop across said orifice and withdrawing liquid from said bell jar and for feeding them into a stream of liquid to be sterilized, a second tube for controlling the drop in pressure across the orifice and for feeding gas and liquid withdrawn by said aspirator into said stream of liquid, a manometer for measuring and indicating the pressure drop across the orifice, a third tube provided within said orifice tube for connecting said manometer with the orifice tube on the downstream side of the flow controlling orifice and pivot means for tilting said three tubes about a common pivot point for adjusting the drop in pressure across said orifice.

GEORG ORNSTEIN.